(12) United States Patent
Eber et al.

(10) Patent No.: US 6,595,414 B1
(45) Date of Patent: Jul. 22, 2003

(54) PASSIVE DATA CARRIER HAVING MEANS FOR REDUCING THE POWER CONSUMPTION

(75) Inventors: Wolfgang Eber, Graz (AT); Peter Thüringer, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/275,369

(22) Filed: Mar. 24, 1999

(30) Foreign Application Priority Data

Mar. 27, 1998 (EP) .............................................. 98890087

(51) Int. Cl.[7] .................................................. G06K 5/00
(52) U.S. Cl. ........................ 235/380; 235/487; 235/492
(58) Field of Search ................................. 235/380, 487, 235/492, 382

(56) References Cited

U.S. PATENT DOCUMENTS

| | | | |
|---|---|---|---|
| 5,286,955 A | 2/1994 | Klosa | 235/380 |
| 5,345,231 A | 9/1994 | Koo et al. | 340/870 |
| 5,418,353 A * | 5/1995 | Katayama et al. | 235/380 |
| 5,449,894 A | 9/1995 | Bruhnke et al. | 235/492 |
| 5,898,738 A * | 4/1999 | Nagata et al. | 235/492 |

* cited by examiner

Primary Examiner—Karl D. Frech

(57) ABSTRACT

A data carrier receives an amplitude-modulated carrier signal that is amplitude modulated in dependence on data to be received. The modulated carrier signal has a high interval of high amplitude and a pause interval of reduced amplitude. The data carrier has a data processor for processing received data. The data carrier generates d.c. power from the received carrier signal and stores the d.c. power, and detects the pause interval. Upon detecting the pause interval, the data carrier generates an identification signal from the received carrier signal. The identification signal is a logic gating signal. In dependence of the identification signal, a controller causes the application of a clock signal to data processor to be inhibited.

10 Claims, 3 Drawing Sheets

PASSIVE DATA CARRIER HAVING MEANS FOR REDUCING THE POWER CONSUMPTION

BACKGROUND OF THE INVENTION

1. Field of the Invention

The invention relates to a data carrier having receiving means for receiving an amplitude-modulated carrier signal which is amplitude-modulated in dependence on data to be received and which comprises high intervals of high amplitude and pause intervals of reduced amplitude, and having power generating means connected to the receiving means and adapted to generate d.c. power from the received carrier signal, which power generating means include storage means for the storage of generated d.c. power, and having pause detection means connected to the receiving means and adapted to detect pause intervals in the received carrier signal and to generate and supply an identification signal upon detection of a pause interval, and having clock signal generating means connected to the receiving means and adapted to generate a clock signal from the received carrier signal and to supply the generated clock signal, and having data processing means arranged to receive d.c. power from the storage means of the power generating means and the clock signal from the clock signal generating means, which data processing means serve for processing data modulated on the received carrier signal and have only an idle power consumption when no clock signal is applied and an operating power consumption higher than the idle power consumption when a clock signal is applied.

The invention further relates to a circuit comprising the means defined hereinafter, namely power generating means to which a received amplitude-modulated carrier signal can be applied, which carrier signal is amplitude-modulated in dependence on data to be received and which comprises high intervals of high amplitude and pause intervals of reduced amplitude, and which are adapted to generate d.c. power from the received carrier signal and which include storage means for the storage of generated d.c. power, and pause detection means to which the received carrier signal can be applied and adapted to detect pause intervals in the received carrier signal and to generate and supply an identification signal upon detection of a pause interval, and clock signal generating means to which the received carrier signal can be applied and adapted to generate a clock signal from the received carrier signal and to supply the generated clock signal, and data processing means arranged to receive d.c. power from the storage means of the power generating means and the clock signal from the clock signal generating means, which data processing means serve for processing data modulated on the received carrier signal and have only an idle power consumption when no clock signal is applied and an operating power consumption higher than the idle power consumption when a clock signal is applied.

2. Description of the Related Art

Such a data carrier of the type defined in the first paragraph has been in use for a relatively long time in different variants for different applications using a circuit of the type defined in the second paragraph, which circuit is commercially available as an IC from the Applicant, and is consequently known. As regards such a known data carrier and such a known circuit reference can also be made to the document U.S. Pat. No. 5,345,231 A. The disclosure in said document is incorporated herewith by reference to said document.

In the known data carrier the d.c. power necessary for the operation of the data carrier is generated by means of power generating means which essentially comprise a rectifier circuit and a storage capacitor connected to the rectifier circuit. The d.c. power needed in the data carrier is derived from the received carrier signal, of which received carrier signal it is mainly the high portions of high amplitude that contribute to the generation of the d.c. power, while there is hardly any power supply to the storage capacitor of the power generating means in the pause intervals of the carrier signal. However, since in spite of the lacking power supply to the storage capacitor the clock signal generating means generate a clock signal during the pause intervals, the data processing means are clocked and consequently require a comparatively much d.c. power, which is then drained from the storage capacitor while at the same time there is no power supply to the storage capacitor. As a result of this, the d.c. power stored by means of the storage capacitor decreases to an undesirable extent, which in its turn leads to a decrease of the internal supply voltage in the data carrier. This decrease of the supply voltage then ultimately limits the range over which communication is possible between the known data carrier and a write/read station adapted to cooperate with this data carrier.

SUMMARY OF THE INVENTION

It is an object of the invention to preclude the aforementioned problem and to provide an improved data carrier and an improved circuit which exhibit hardly any loss in attainable range.

According to the invention, in order to achieve the aforementioned object in a data carrier of the type defined in the first paragraph control means have been provided, which include pause detection means and which upon detection of a pause interval cause the application of the clock signal to the data processing means to be inhibited.

According to the invention, in order to achieve the aforementioned object in a circuit of the type defined in the second paragraph control means have been provided, which include pause detection means and which upon detection of a pause interval cause the application of the clock signal to the data processing means to be inhibited.

By means of the measures in accordance with the invention it is achieved in a simple and advantageous manner, using the pause detection means which are present anyway, that in those time intervals in which there is no power supply to the storage means of the power storage means, because a pause interval occurs in the carrier signal being received, the supply of the clock signal to the data processing means is inhibited at least for a substantial part, as a result of which there is no unnecessary power consumption in the data processing means, which are energized with d.c. power from the storage means. Thus, it is achieved that the d.c. energy stored in the storage means is reduced only to a comparatively small extent during the pause intervals, as a result of which the internal supply voltage in the data carrier is not reduced significantly and, consequently, there is hardly any adverse effect on the range over which communication is possible between a data carrier in accordance with the invention and a write/read station adapted to cooperate with this data carrier.

With respect to the advantageous variants of a data carrier in accordance with the invention and a circuit in accordance with the invention as defined in the dependent claims it is to be noted that these variants have proved to be advantageous in view of a very simple and reliable implementation.

The afore-mentioned as well as further aspects of the invention will become apparent from the examples of an embodiments described hereinafter and will be elucidated with reference to these examples.

BRIEF DESCRIPTION OF THE DRAWINGS

The invention will be described in more detail with reference to the drawings, which show examples of embodiments to which the invention is not limited.

DETAILED DESCRIPTION OF THE INVENTION

Figure 1:
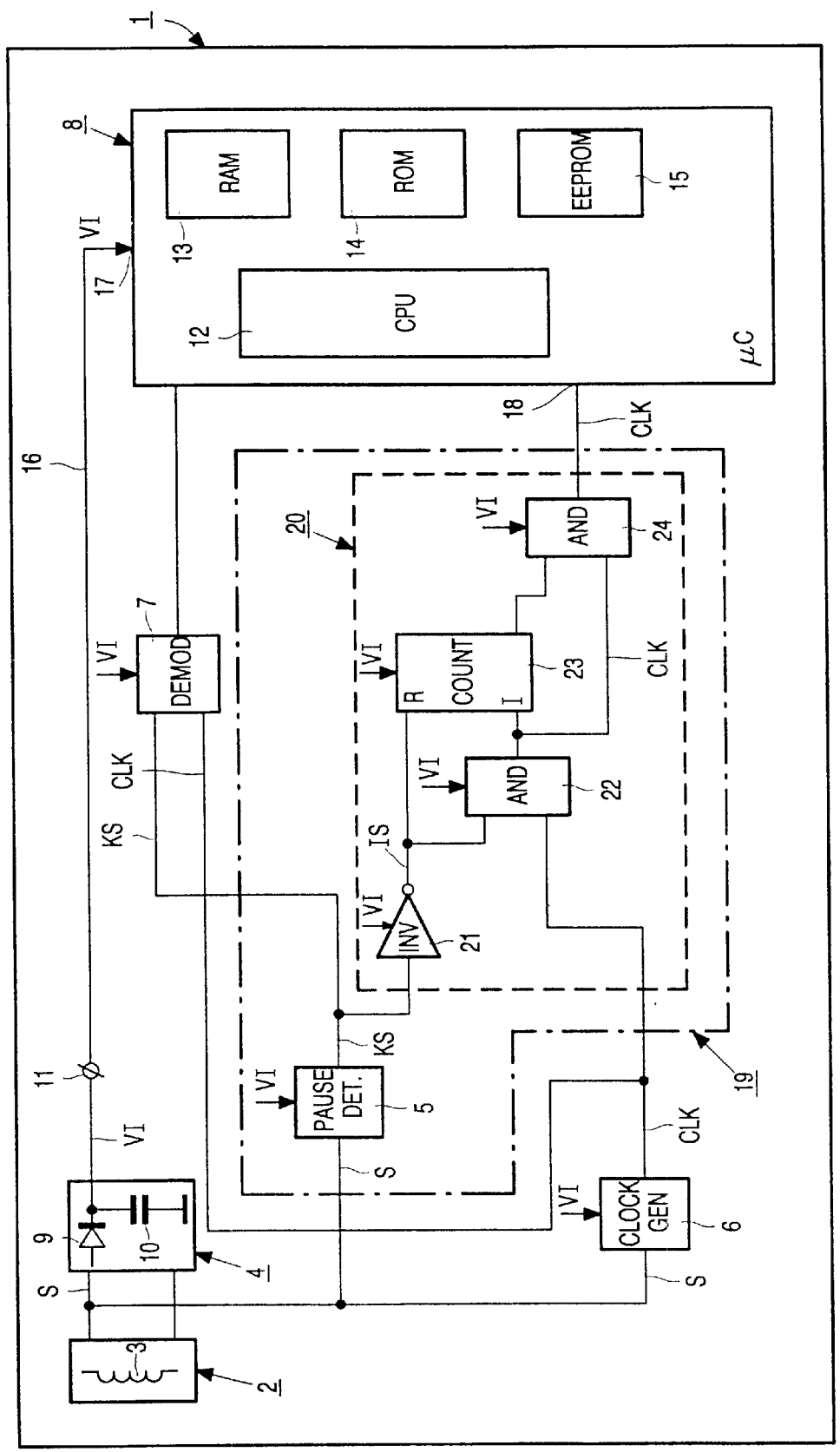
FIG. 1 is a block diagram which diagrammatically shows a data carrier in accordance with a first embodiment of the invention.

FIG. 1 shows a data carrier 1. In the present case this is a contactless chip card. However, the data carrier 1 may also take another form.

The data carrier 1 includes receiving means 2 which serve and are constructed to receive an amplitude-modulated carrier signal S. The receiving means 2 comprises a transmission coil 3 which can be coupled inductively to a transmission coil of a transmitting/receiving station, not shown, thereby enabling inductive communication between the two transmission coils. It is thus possible to transmit data to the data carrier 1 by means of the amplitude-modulated carrier signal S.

Figure 2:
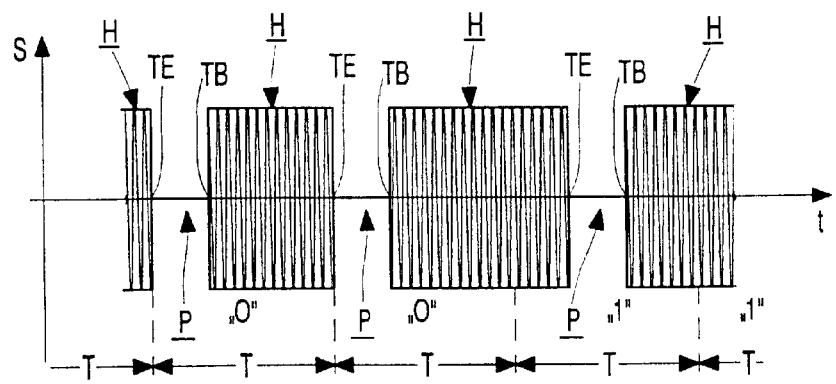
FIG. 2 is a diagram which shows an amplitude-modulated carrier signal which can be received and processed with the data carrier shown in FIG. 1.

The amplitude-modulated carrier signal S is amplitude-modulated in dependence on the data to be received by the data carrier 1. FIG. 2 shows an example of such a carrier signal S. The carrier signal S shown in FIG. 2 has a 100% amplitude modulation. The amplitude-modulated carrier signal S comprises high intervals H of high amplitude and pause intervals P of reduced amplitude, the reduced amplitude being reduced to the value zero in the present case owing to the 100% amplitude modulation. However, this is not strictly necessary and the reduced amplitude in the pause intervals may also have an amplitude reduced by a given percentage with respect to the high amplitude of the high intervals, for example an amplitude reduced by 75% but also by 10%.

As regards the carrier signal S as shown in FIG. 2 it is to be noted that this carrier signal S has been amplitude-modulated in accordance with the so-called Miller code. In this type of coding a fixed time interval is used for the coding of each bit. A "0" bit is then encoded by defining a pause interval P at the beginning of such a time interval T and a "1" bit is encoded by defining a pause interval P in the center of such a time interval T, as can be seen in FIG. 2.

It is to be noted that, of course, alternative coding types are possible for the amplitude-modulation of a carrier signal for data transmission. For example, coding can also be effected in such a manner that a "0" bit is represented by a high interval H of a duration T1 and a "1" bit by a high interval H of a duration T2 and that pause intervals P of a fixed pause duration T3 are provided between all the high intervals H.

Figure 3A:
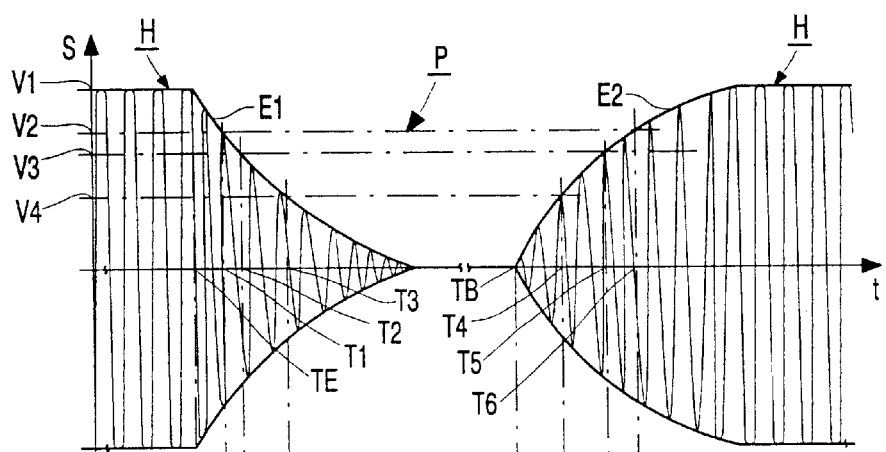
FIGS. 3A to 3H are waveform diagrams of signals and conditions which occur in the data carrier shown in FIG. 1.

FIG. 2 represents the amplitude-modulated carrier signal S in an idealized manner. This is because the transitions between the high intervals H and the pause intervals P are shown as ideally steep edges. In reality, the amplitude-modulated carrier signal S does not have such ideally steep edges because, as a result of the quality factor of the transmission coil in a write/read station and the quality factor of the transmission coil 3 in the data carrier 1 and the components cooperating with this system, which together form an oscillatory system, the carrier signal S decays at the beginning of a pause interval P and the carrier signal S builds up at the end of a pause interval P, as is shown in FIG. 3A. It is assumed that, as is shown in FIG. 3A, the amplitude-modulated carrier signal S supplied by the receiving means 2 has a voltage value V1 in the high intervals. Furthermore, it is assumed that, as is shown in FIG. 3A in conformity with FIG. 2, a high interval H of the carrier signal S ends at an end instant TE and a subsequent high interval H begins at a starting instant TB. This means that a pause interval P lies nominally between the instants TE and TB.

The data carrier 1 comprises power generating means 4, pause detection means 5, clock signal generating means 6, a data demodulator 7 and data processing means 8. These individual parts of the data carrier 1 will be described in more detail hereinafter.

The power generating means 4 are connected to the receiving means 2, as a result of which the amplitude-modulated carrier signal S received by the receiving means 2 and supplied by the receiving means 2 is applied to the power generating means 4. The power generating means 4 are adapted to generate d.c. power from the received carrier signal S. The power generating means 4 comprise a rectifier device represented diagrammatically as a diode 9, by means of which a direct voltage is derived from the received carrier signal S. For storing the generated d.c. power the power generating means 14 comprise storage means 10, which are formed by a capacitor. The power generating means 4 produce a internal d.c. supply; voltage VI on an output 11, which voltage is used for powering all the components of the data carrier 1. It is to be noted that most of the d.c. power is required by the data processing means 8.

The pause detection means 5 are also connected to the receiving means 2, as a result of which the received amplitude-modulated carrier signal S is also applied to the pause detection means 5. The pause detection means 5 are adapted to detect pause intervals P in the received carrier signal S and to generate and supply an identification signal KS upon detection of a pause interval P.

In the present case the identification signal KS generated by the pause detection means 5 is applied to the data demodulator 7, which also receives a clock signal CLK and which, by means of the identification signal KS and the clock signal CLK, detects the data transmitted to the data carrier 1 and enables the detected data to be applied to the data processing means 8.

The clock signal generating means 6 are likewise connected to the receiving means 2, as a result of which the received amplitude-modulated carrier signal S is also applied to the clock signal generating means 6. The clock signal generating means 6 are adapted to generate the clock signal CLK from the received carrier signal S and to supply the generated clock signal CLK.

The data processing means 8 are essentially formed by a microcomputer. The principal elements of the data processing means 8 are shown diagrammatically and include a central processing unit (CPU) 12, first memory means (RAM) 13, second memory means (ROM) 14 and third memory means (EEPROM) 15. The data processing means 8 can be energized with d.c. power from the storage means 10 of the power storage means 4, for which purpose the output 11 of the power storage means 4 is connected to a power supply input 17 of the data processing means 8 by a line 16.

Furthermore, the data processing means 8 can receive the clock signal CLK from the clock signal generating means 6, which can be applied to a clock signal input 18 of the data processing means 8.

The data processing means 8 serve for processing data modulated on the carrier signal S. The data processing means 8 have such a design that in the case that no clock signal CLK is received the data processing means 8 have only a very low idle power consumption and in the case that a clock signal CLK is received the data processing means 8 have a operating power consumption which is higher than the particularly low idle power consumption.

The operation of the power generating means 4, the pause detection means 5 and the clock signal generating means 6 is described in more detail hereinafter with reference to FIGS. 3A, 3B, 3C and 3D.

Figure 3B:
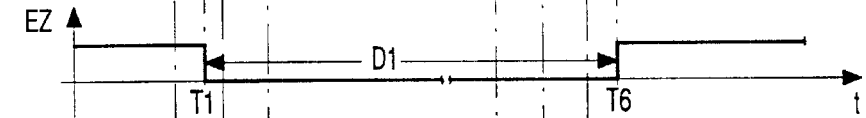
Figure 3C:
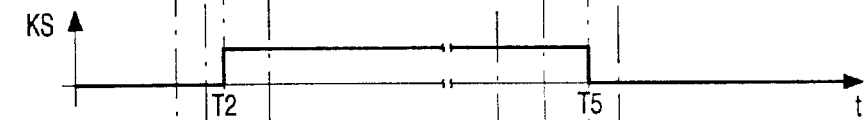
Figure 3D:
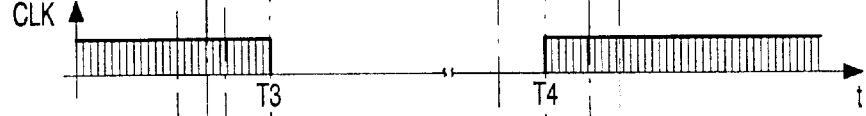

FIG. 3A shows the actual waveform of a part of a received amplitude-modulated carrier signal S, which part includes a pause interval P. FIG. 3B shows for the carrier signal S of FIG. 3A in which time intervals the power generating means 4 supply power EZ to the storage means 10. FIG. 3C shows the identification signal KS generated by the pause detection means 5 upon detection of a pause interval P in relation to the carrier signal S of FIG. 3A. As shown in FIG. 3C, the indetification signal KS is a logic gating signal that starts at instant T2 and stops at instant T5. FIG. 3D shows the clock signal CLK generated by the clock signal generating means 6 in relation to the carrier signal S of FIG. 3A.

It is assumed, as shown in the diagram of FIG. 3A, that the carrier signal S has a high interval H which ceases at the end instant TE. As a result, the amplitude of the carrier signal S decreases in accordance with an envelope E1 having an exponential function. Initially, as is apparent from FIG. 3B, this decrease of the amplitude of the carrier signal S has no effect on the power supply EZ to the storage means 10. However, when the amplitude of the carrier signal S reaches a threshold value V2, this results in the power supply EZ to the storage means 10 by the power generating means 4 being stopped. This means that that the power supply EZ to the storage means 10 is interrupted from the instant T1, as can be seen in FIG. 3B.

Subsequently, i.e. when the amplitude of the carrier signal S reaches the threshold value V3, the pause detection means 5 detect the beginning of a pause interval P. As a result of this, the pause detection means 5 supply the identification signal KS starting at the instant T2, as can be seen in FIG. 2.

During the processes described above the clock signal generating means 6 continually generate the clock signal CLK from the received carrier signal S. The generation of the clock signal CLK proceeds until the amplitude of the carrier signal S reaches a threshold value V4, which is the case at the instant T3. As a result of this, the generation of the clock signal CLK is discontinued at the instant T3, as can be seen in FIG. 3D.

Subsequently, the amplitude of the carrier signal S decreases further until it has substantially reached the value zero.

After this, the pause interval P in the carrier signal S is terminated at the instant TB. As a result of this, the carrier signal S increases in accordance with an envelope E2 which also has an exponential function.

As soon as the amplitude of the carrier signal S reaches the threshold value V4, which occurs at the instant T4, the clock signal generating means 6 again begin to generate and supply the clock signal CLK, as can be seen in FIG. 3D.

Subsequently, the amplitude of the carrier signal S reaches the threshold value V3 at the instant T5. As a result of this, the pause detection means 5 detect the end of the pause interval P, as a consequence of which the pause detection means 5 stop the generation of the identification signal KS, as can be seen in FIG. 3C.

Subsequently, the still increasing amplitude of the carrier signal S reaches the threshold value V2 at the instant T6. As a result of this, the power generating means 4 resume the supply EZ of d.c. power to the storage means 10 at the instant T6, as can be seen in FIG. 3B. As the amplitude of the carrier signal S increases further to the nominal maximum value V1 the supply EZ of d.c. power to the storage means 10 is, of course, sustained.

As can be seen in FIG. 3B the power supply EZ to the storage means 10 is interrupted between the instants T1, and T6. This means that during the time interval D1 there is not supply EX of power to the storage means 10.

Figure 3E:
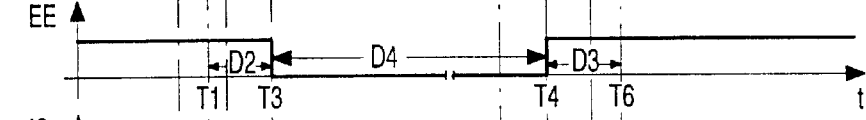

If the clock signal CLK generated by the clock signal generating means 6 and shown in FIG. 3D would have been applied to the data processing means 8 without any precautionary measures, this would have resulted, as can be seen in FIG. 3E, in a higher operating power consumption of the data processing means 8 between the instants T1 and T3, i.e. in the time interval D2, and between the instants T4 and T6, i.e. in the time interval D3,: and in the particularly low idle power consumption only between the instants T3 and T4, i.e. in the time interval D4. A consequence of this, however, would be that in both time intervals D2 and D3 the higher operating power consumption in the data processing means 8 would cause a d.c. power drain EE from the storage means 10 without any power supply EE to the storage means 10. This would cause a reduction of the d.c. supply voltage VI at the output 11 of the power generating means 4, which would give rise to a reduction of the attainable range of the data carrier 1.

In order to preclude the problems outlined in the preceding paragraph the data carrier 1 shown in FIG. 1 advantageously comprises control means 19 which include the pause detection means 5 and which inhibit application of the clock signal CLK to the data processing means 8 upon detection of a pause interval P.

The control means 19 comprise logic means 20. The identification signal KS generated by the pause detection means 5 and the clock signal CLK generated by the clock signal generating means 6 can be applied to the logic means 20. The logic means 20 are designed in such a manner that the logic means 20 inhibit application of the clock signal CLK to the data processing means 8 in dependence on the identification signal KS.

Figure 3F:
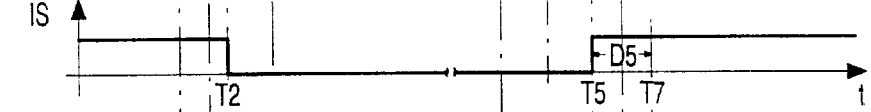

The logic means 20 include an inverter 21 connected to the pause detection means 5 and arranged to receive the identification signal KS. The inverter 21 can generate a control signal IS which, as shown in FIG. 3F, is inverted relative to the identification signal KS shown in FIG. 3C.

The logic means 20 further include a first AND gate 22 having a first input connected to the output of the inverter 21 and having a second input connected to the output of the clock signal generating means 6, as a result of which the control signal IS can be applied to the first input and the clock signal CLK can be applied to the second input. Furthermore, the logic means 20 includes a so-called n-bit counter 23. The counter 23 has a reset input R connected to the output of the inverter 21, as a result of which the control signal IS can be applied to the reset input R. The counter 23 has a count input I connected to the output of the first AND gate 22.

The logic means 20 further include a second AND gate 24 having a first input connected to output of the counter 23 and having a second input connected to the output of the first AND gate 22. The output of the second AND gate 24 also forms the output of the logic means 20 and is connected to the clock signal input 18 of the data processing means 8.

The operation of the control means 19 and, particularly of the logic means 20, is described in more detail hereinafter.

As long as a high interval H having a voltage value V1 appears in the received carrier signal S the pause detection means 5 do not supply an identification signal Ks, as a result of which the inverted control signal IS supplied by the inverter 21 exhibits a high level, as can be seen in FIG. 3F. As long as this is the case, i.e. a high level appears at the first input of the first AND gate 22, the clock signal CLK applied to the second input of the first AND gate 22 is transferred by the first AND gate 22 and is subsequently also transferred to the clock signal input 18 of the data processing means 8 by the second AND gate 24.

If subsequently a pause interval P appears in the carrier signal S this results in an identification signal KS being supplied by the pause detection means 5 from the instant T2, as a result of which the inverter 21 produces a low level at its output from the instant T2, as can be seen in FIG. 3F. A consequence of this is that the first AND gate 22 immediately stops the transfer of the clock signal CLK via the first AND gate 22. In this way, it is achieved that from the instant T2 the application of the clock signal CLK to the data processing means 8 is inhibited. Thus, the logic means 20 are adapted to immediately inhibit the application of the clock signal CLK to the data processing means 8 upon the appearance of the identification signal KS. This means that in the subsequent pause interval P no clock signal CLK is transferred to the data processing means 8. Since the instant T2 depends on the threshold value V3 the occurrence of the instant T2 can be influenced by the choice of threshold value V3. The time interval between the instant T2 and the instant T1 decreases according as the threshold value V3 lies closer to the threshold value V2.

When after this the end of the pause interval P shown in FIG. 3A is reached and subsequently the instant T5 is reached at which the pause detection means 5 stop the generation of the identification signal KS shown in FIG. 3C, this results again in a high potential at the output of the inverter 21, as is shown in FIG. 3F.

Figure 3G:

The high potential at the output of the inverter 21 causes the AND gate 22 to transfer the clock signal CLK immediately. However, the second AND gate 24 inhibits an immediate further transfer of the clock signal CLK which appears at the output of the first AND gate 22 as a result of this, because the high potential at the output of the inverter 21 is also applied to the reset input R of the counter 23, as a result of which the counter 23 is reset and consequently the produces a low potential at its output, which potential is applied to the first input of the second AND gate 24 and thereby inhibits the transfer of the clock signal CLK applied to the second input. In response to the clock signal CLK applied to it via the first AND gate 22 the previously reset counter 23 starts a counting operation, which proceeds until the counter 23 has reached a given count. It is assumed that this counting operation started at the instant T5 covers a time interval D5, as is shown in FIG. 3F. Upon expiry of the time interval D5 the counter produces a high potential at its output, as a result of which upon termination of the time interval D5, i.e. at the instant T7, the second AND gate 24 enables the clock signal CLK applied to its second input to be transferred, so that from the instant T7 the clock signal CLK is applied to the clock signal input 18 of the data processing means 8, as is shown in FIG. 3G.

Thus, a delay in the transfer of the clock signal CLK is achieved by means of the counter 23. This means, in other words, that the logic means 20 are adapted to effect the delayed termination of the inhibition of the transfer of the clock signal CLK to the data processing means 8 when the identification signal KS ceases to appear.

Figure 3H:
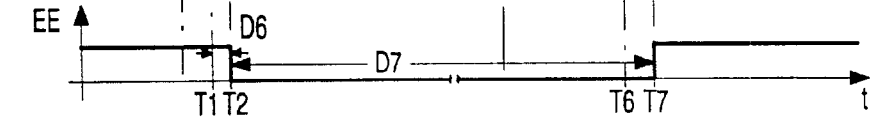

By the provision of the control means 19 it is achieved in a simple manner that the transfer of the clock signal CLK to the data processing means 8 can be inhibited at least for the greater part upon detection of a pause interval P, as a result of which the power drain EE from the storage means 10 caused by the data processing means 8 is reduced significantly, as can be seen in FIG. 3H, which diagrammatically represents the power drain EE from the storage means 10. Upon the termination of a supply of power EZ to the storage means 10 at the instant T1 the data processing means 8, as is apparent from FIG. 3H, only drain power EE from the storage means 10 until the instant T2 because the clock signal CLK is applied to the data processing means 8 only till the instant T2 and the data processing means 8 consequently have a higher operating power consumption. Thus, power is drained from the storage means 10 only in the short time interval D6. There is no power drain EE from the storage means 10 by the data processing means 8 after the instant T2 in the time interval D7 until the instant T7, which is very advantageous because, as is apparent from FIG. 3B, a supply of power EZ to the storage means is resumed already at the instant T6 prior to the instant T7.

Figure 4:
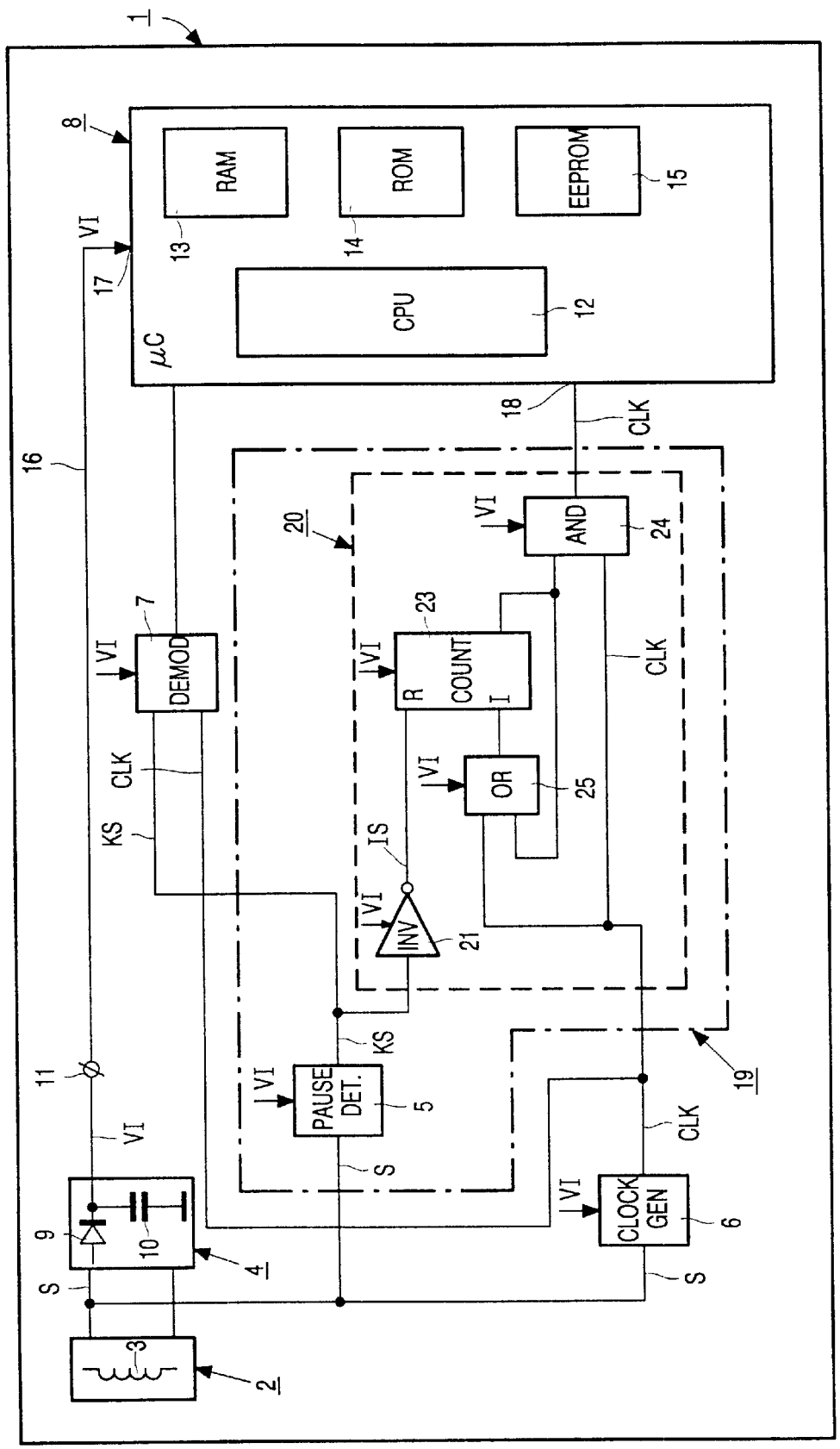
FIG. 4, in the same way as FIG. 1, shows a data carrier in accordance with a second embodiment of the invention.

FIG. 4 shows a data carrier 1 in a second embodiment of the invention, which differs from the data carrier shown in FIG. 1 with respect to the design of the logic means 20 of the control means 19.

In the data carrier 1 shown in FIG. 4 the logic means 20 also include an inverter 21, a counter 23 and an AND gate 24, while in addition an OR gate 25 has been provided. The OR gate 25 has a first input connected to the output of the clock signal generating means 6 and the OR gate 25 has a second input connected to the count input I of the counter 23. In the present case, the clock signal CLK is applied directly to the second input of the AND gate 24.

The operation of the logic means 20 of the data carrier 1 shown in FIG. 4 is wholly identical to the operation of the logic means 20 of the data carrier 1 shown in FIG. 1.

We claim:
1. A data carrier comprising:
receiving means for receiving an amplitude-modulated carrier signal which is amplitude-modulated in dependence on data to be received and which comprises a high interval of high amplitude and a pause interval of reduced amplitude;
power generating means coupled to the receiving means and configured to generate d.c. power from the received carrier signal, which power generating means include storage means for storing the generated d.c. power;
pause detection means coupled to the receiving means and configured to detect the pause interval and to generate from the received carrier signal an identification signal upon detection of the pause interval, the identification signal being a logic gating signal;

clock signal generating means coupled to the receiving means and configured to generate a clock signal from the received carrier signal;

data processing means configured to receive the d.c. power and the clock signal which data processing means is configured to process the data modulated on the received carrier signal and has an idle power consumption when no clock signal is applied to the data processing means and an operating power consumption higher than the idle power consumption when a clock signal is applied to the data processing means; and control means, which include the pause detection means and which upon detection of the pause interval cause the application of the clock signal to the data processing means to be inhibited in dependence of the identification signal.

2. A data carrier as claimed in claim 1, wherein the control means further comprises logic means, the identification signal and the clock signal being applied to the logic means, and the logic means inhibiting the application of the clock signal to the data processing means.

3. A data carrier as claimed in claim 2, wherein the logic means is configured to start to inhibit the application of the clock signal to the data processing means immediately upon occurrence of the identification signal.

4. A data carrier as claimed in claim 2, wherein the logic means is configured to stop to inhibit the application of the clock signal to the data processing means with a delay upon ceasing of the identification signal.

5. A data carrier as claimed in claim 1, wherein the received carrier signal is a decreasing signal at a start of the pause interval and an increasing signal before an end of the pause interval, and the identification signal starts at a first instant when the decreasing received carrier signal passes a first threshold and stops at a second instant when the increasing received carrier signal passes the first threshold.

6. A data carrier as claimed in claim 5, wherein the control means comprises logic means that is configured to start to inhibit the application of the clock signal to the data processing means immediately from the first instant and to stop to inhibit the application of the clock signal to the data processing means at a delayed instant after the second instant.

7. A circuit for a data carrier, the circuit comprising:

power generating means to which a received amplitude-modulated carrier signal is applicable, which carrier signal is amplitude-modulated in dependence on data to be received and which comprises a high interval of high amplitude and a pause interval of reduced amplitude, which power generating means is configured to generate d.c. power from the received carrier signal and includes storage means for storing the generated d.c. power;

pause detection means configured to detect the pause interval and to generate from the received carrier signal an identification signal upon detection of the pause interval, the identification signal being a logic gating signal;

clock signal generating means configured to generate a clock signal from the received carrier signal;

data processing means configured to receive the d.c. power and the clock signal which data processing means is configured to process the data modulated on the received carrier signal and has an idle power consumption when no clock signal is applied to the data processing means and an operating power consumption higher than the idle power consumption when a clock signal is applied to the data processing means; and control means, which include the pause detection means and which upon detection of the pause interval cause the application of the clock signal to the data processing means to be inhibited in dependence of the identification signal.

8. A circuit as claimed wherein the control means further comprises logic means, the identification signal and the clock signal being applied to the logic means, and the logic means inhibiting the application of the clock signal to the data processing means.

9. A circuit as claimed in claim 8, wherein the logic means is configured to start to inhibit the application of the clock signal to the data processing means immediately upon occurrence of the identification signal.

10. A circuit as claimed in claim 8, wherein the logic means is configured to stop to inhibit the application of the clock signal data processing means with a delay upon ceasing of the identification signal.

* * * * *